(12) United States Patent
Botrel et al.

(10) Patent No.: US 8,348,602 B2
(45) Date of Patent: Jan. 8, 2013

(54) TURBOMACHINE TURBINE RING SECTOR

(75) Inventors: Erwan Daniel Botrel, Alfortville (FR); Claire Dorin, Maisons-Alfort (FR)

(73) Assignee: Snecma, Paris (FR)

( * ) Notice: Subject to any disclaimer, the term of this patent is extended or adjusted under 35 U.S.C. 154(b) by 1240 days.

(21) Appl. No.: 11/926,908

(22) Filed: Oct. 29, 2007

(65) Prior Publication Data

US 2008/0101923 A1  May 1, 2008

(30) Foreign Application Priority Data

Oct. 30, 2006 (FR) ...................................... 06 09501

(51) Int. Cl.
*F01D 25/14* (2006.01)

(52) U.S. Cl. ................................................... 415/173.1

(58) Field of Classification Search .................. 415/116, 415/173.1, 173.4, 174.4, 213.1
See application file for complete search history.

(56) References Cited

U.S. PATENT DOCUMENTS

| | | | | |
|---|---|---|---|---|
| 3,583,824 A * | 6/1971 | Smuland et al. | ............... | 415/117 |
| 4,157,232 A * | 6/1979 | Bobo et al. | ..................... | 415/116 |
| 4,177,004 A * | 12/1979 | Riedmiller et al. | ........... | 415/116 |
| 4,222,707 A * | 9/1980 | Drouet et al. | .................. | 415/116 |
| 4,303,371 A * | 12/1981 | Eckert | ............................ | 415/116 |
| 4,693,667 A * | 9/1987 | Lenz et al. | ..................... | 415/115 |
| 5,127,793 A * | 7/1992 | Walker et al. | .................. | 415/115 |
| 5,273,396 A * | 12/1993 | Albrecht et al. | ............ | 415/173.1 |
| 5,439,348 A * | 8/1995 | Hughes et al. | .............. | 415/173.4 |
| 5,584,651 A * | 12/1996 | Pietraszkiewicz et al. | ... | 415/115 |
| 5,772,400 A * | 6/1998 | Pellow | ........................ | 415/173.1 |
| 6,155,778 A * | 12/2000 | Lee et al. | ....................... | 415/116 |
| 6,200,091 B1 * | 3/2001 | Bromann et al. | .......... | 415/173.1 |
| 6,340,285 B1 * | 1/2002 | Gonyou et al. | ............... | 415/116 |
| 6,354,795 B1 * | 3/2002 | White et al. | .................. | 415/116 |
| 6,412,149 B1 * | 7/2002 | Overberg | ........................ | 24/455 |
| 6,659,714 B1 | 12/2003 | Tiemann | | |
| 6,997,673 B2 * | 2/2006 | Morris et al. | ...................... | 415/1 |
| 7,124,590 B2 * | 10/2006 | Hoff et al. | ........................ | 60/785 |
| 7,147,432 B2 * | 12/2006 | Lowe et al. | ................... | 415/116 |
| 7,162,876 B2 * | 1/2007 | Hoff et al. | ....................... | 60/785 |
| 7,559,740 B2 * | 7/2009 | Bigi et al. | ...................... | 415/136 |
| 2003/0131980 A1 | 7/2003 | DeMarche et al. | | |
| 2005/0129499 A1 | 6/2005 | Morris et al. | | |

FOREIGN PATENT DOCUMENTS

| | | |
|---|---|---|
| EP | 1 775 426 A2 | 4/2007 |
| GB | 1 330 892 | 9/1973 |

\* cited by examiner

*Primary Examiner* — Richard Edgar
*Assistant Examiner* — Sean J Younger
(74) *Attorney, Agent, or Firm* — Oblon, Spivak, McClelland, Maier & Neustadt, L.L.P.

(57) ABSTRACT

A turbine ring sector is disclosed. The turbine ring sector includes a wall bounding an aerodynamic flowpath in which gases flow from the upstream region toward the downstream region, and a multiperforated plate, situated on the opposite side of the aerodynamic flowpath with respect to the wall. The multiperforated plate includes a bottom and side walls. The distance between the wall of the ring sector and the bottom of the multiperforated plate defines a gap which is progressive in an axial direction, from the upstream region toward the downstream region. The value of the gap situated at the upstream region is below the value of the gap situated at the downstream region.

14 Claims, 3 Drawing Sheets

TURBOMACHINE TURBINE RING SECTOR

BACKGROUND OF THE INVENTION AND DESCRIPTION OF THE PRIOR ART

The present invention concerns the field of turbomachines, in particular the cooling of the ring sectors of a turbine of a turbomachine.

An aeronautical turbomachine conventionally includes a compressor, a combustion chamber and a turbine. The job of the turbine is to rotate the compressor by extracting some of the pressure energy from the hot gases leaving the combustion chamber and converting this energy into mechanical energy.

The turbine, situated downstream of the combustion chamber, is the component of the turbomachine that operates under the harshest conditions. It is, in particular, subjected to high thermal and mechanical stresses generated by the hot gases leaving the chamber.

A turbine conventionally comprises at least one nozzle guide vane assembly, consisting of a cascade of vanes which are fixed with respect to the casing of the turbomachine, and at least one rotor, comprising a set of blades which can be made to rotate.

A rotor is surrounded by a fixed ring secured to the casing. This ring has the function in particular of reconstituting, by way of its inner surface, the outer limit of the aerodynamic flowpath. In most cases, this ring can be made up of a plurality of sectors. Owing to its permanent exposure to the hot gases, a turbine ring has a reduced service life. It is therefore necessary to cool it so that it is able to withstand high temperatures effectively.

A known cooling solution consists in providing the ring with multiperforated plates surrounding said ring. Such plates are described in documents EP0893577, EP1134360, EP0516322, EP1225309 and EP1533478. A multiperforated plate generally has the shape of a bath in the sense that it comprises a bottom and side walls. Orifices are distributed essentially over the bottom of the multiperforated plate in rows. Cooling air passes through the multiperforated plate via the orifices and impacts the wall of the ring so as to cool it. The bottom of the multiperforated plate is spaced from the ring via a gap. All these prior art documents have a constant gap. Documents GB1330892 and US2003/0131980 disclose gaps which are progressive in an axial direction but which nevertheless remain unsatisfactory in terms of cooling.

The temperature is not uniform in all points of the ring. The effect of this is to create deformations therein. When the ring is made up of a plurality of sectors, each sector takes the form of an arc of a circle corresponding to an angular sector of the ring. A multiperforated plate corresponds to each ring sector.

A first type of deformation can be manifested circumferentially by a decambering of the sectors, that is to say a loss in the concentricity of the sectors, and hence of the ring.

A second type of deformation can be manifested axially by an axial canting of the sectors, that is to say an excessive offset in the distance between the upstream part or the downstream part of the sectors and the axis (X) of the turbomachine on which they are fastened.

These two types of deformations can lead to mechanical wear of the ring as a result of frictional engagement by the rotor blades situated opposite. Such wear creates an irreversible clearance between the tips of the blades and the turbine ring. This clearance is detrimental to the efficiency of the turbomachine.

To attenuate these deformations, it is necessary for the temperature of the ring sectors to be made uniform. To achieve this, it is known practice to vary different parameters on a multiperforated plate, such as the diameter of the orifices, the number of orifices per row or the pitch between each row.

SUMMARY OF THE INVENTION

The object of the present invention is to overcome the aforementioned problems by providing a solution which is more effective than the existing solutions. Accordingly, the invention relates to a turbine ring sector comprising:
  a wall bounding an aerodynamic flowpath in which gases flow from the upstream region toward the downstream region, and
  a multiperforated plate, situated on the opposite side of the aerodynamic flowpath with respect to the wall, said multiperforated plate comprising a bottom and side walls, the distance between the wall of the ring sector and the bottom of the multiperforated plate defining a gap.

According to an essential feature of the invention, the gap is progressive, that is to say non-constant or else variable. In other words, unlike the prior ring sectors provided with a multiperforated plate, the plane of the bottom of the multiperforated plate according to the invention is not separated by a constant distance from the plane of the wall of the ring sector.

This progression of the gap can occur in an axial and/or circumferential direction.

According to an advantageous feature of the invention, the value of the gap situated at the upstream region is below the value of the gap situated at the downstream region.

The bottom of the multiperforated plate can adopt a multitude of shapes. In particular, it can be progressive linearly, curvilinearly or else in stages, over its whole extent or over only part thereof.

The invention advantageously makes it possible to reduce the thermal gradient on the ring sectors. A reduction of 40 Kelvin or more is reckoned, thus making it possible to increase the service life of the rings.

Advantageously, the ring sector according to the invention can not only equip future turbines but also turbines in service which already have ring sectors comprising a multiperforated plate. By determining the regions of the ring sector that are to be cooled more intensely, it is possible to replace the old multiperforated plate with a new multiperforated plate according to the invention in order to improve the characteristics of the turbine and increase its service life, this being achieved with a reduced adjustment time and without modifying the surrounding components.

BRIEF DESCRIPTION OF THE DRAWINGS

Other advantages and features of the invention will become apparent on reading the detailed description which follows with reference to the appended figures, given as non-limiting examples, in which.

DESCRIPTION OF THE PREFERRED EMBODIMENTS

Figure 1:
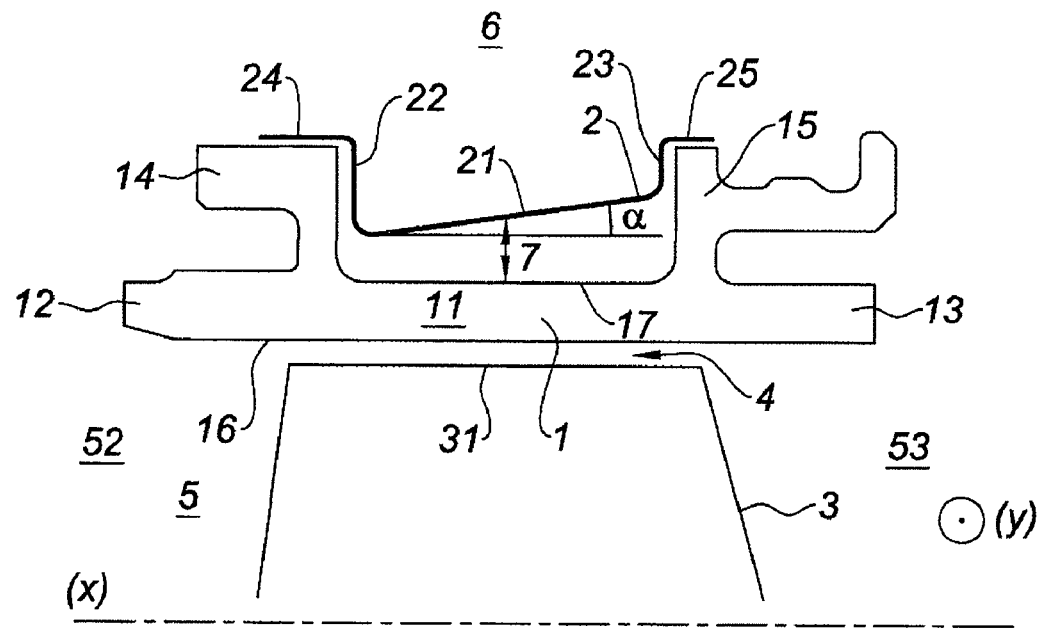
FIG. 1 represents a sectional view of a ring sector according to a first embodiment of the invention.

FIG. 1 illustrates a turbine ring sector 1 formed by a wall 11 having an inner surface 16 and an outer surface 17, the inner surface 16 bounding the outer limit of an aerodynamic flowpath 5.

When the ring sectors 1 are mounted on the turbine 8 of a turbomachine 9, they circumferentially surround a rotor in which the tips 31 of the blades 3 are situated opposite the inner surface 16 of the wall 11 of the ring sector 1. The space situated between the tips 31 of the blade 3 and the inner surface 16 of the wall 11 of the ring sector 1 forms a clearance 4.

A ring sector 1 is generally fastened to the casing (not shown) of a turbine 8 by fastening means such as tenons 14 and 15 which project from the outer surface 17 of the wall 11 of the ring sector 1. These tenons 14 and 15, situated at each of the upstream 12 and downstream 13 ends of the ring sector 1, are intended to cooperate with complementary annular grooves (not shown).

The upstream region and the downstream region are defined in relation to the direction of flow of the gases in the aerodynamic flowpath 5. In FIG. 1, the upstream region 52 is situated to the left and the downstream region 53 is situated to the right.

A space bounded by the tenons 14 and 15 and the outer surface 17 of the wall 11 of the ring sector 1 defines a first "bath", the tenons 14 and 15 forming the side walls of the bath and the wall 11 of the ring sector 1 forming the bottom of the bath.

This first bath makes it possible to house a multiperforated plate 2 which takes the form of a second "bath" having side walls 22 and 23 and a bottom 21. The ends 24 and 25 of the side walls 22 and 23 of the multiperforated plate 2 are curved and form rims so as to be able to bear respectively on the tenons 14 and 15 of the ring sector 1. The thickness of a multiperforated plate 2 is substantially less than the thickness of the ring sector 1. The multiperforated plate 2 can be obtained by stamping. It is possible for this multiperforated plate 2 to be fastened to the ring sector 1 by brazing. The wall 11 of the ring sector 1 and the bottom 21 of the multiperforated plate 2 are separated by a distance forming a gap 7.

Figure 2:
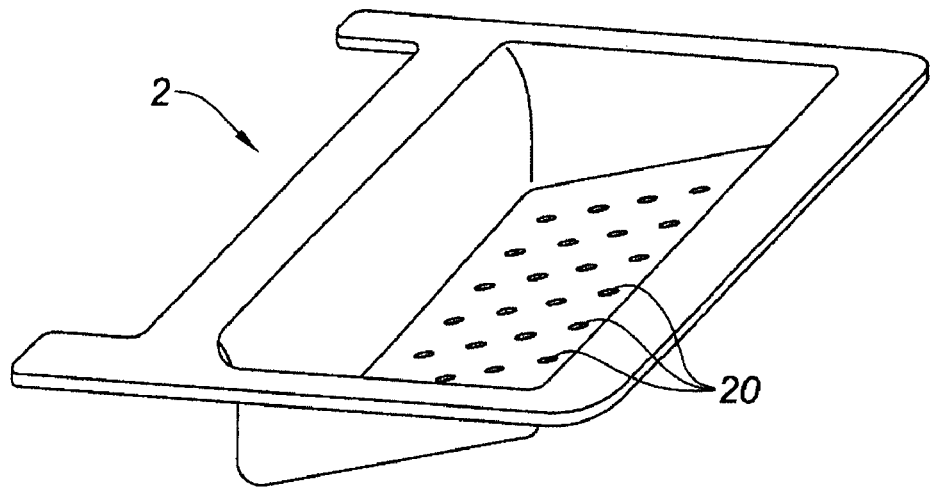
FIG. 2 represents a perspective view of a multiperforated plate according to a first embodiment of the invention.

Pressurized cooling air, which can be bled from the end wall of the combustion chamber, from the compressor or from any other equivalent means capable of supplying fresh air, is conveyed into a space 6 situated on the opposite side of the ring sector 1 with respect to the multiperforated plate 2. The overpressure in the space 6 forces the cooling air to pass through the multiperforated plate 2 via orifices 20 represented in FIG. 2. The orifices 20 can be produced by an electro discharge machining (EDM) method or by a laser drilling method.

The cooling air leaving the multiperforated plate 2 through the orifices 20 impacts the outer surface 17 of the wall 11 of the ring sector 1. Heat exchanges occur in each impact region opposite each orifice 20. The air thus heated is then discharged into the aerodynamic air flowpath 5 via passages (not shown) generally produced through the ring sector 1. These passages may be identical to those described in the aforementioned documents, for example document EP0516322 which discloses a ring sector having very long passages. The air leaving these passages to enter the aerodynamic flowpath 5 must have a sufficient flow rate in order to initiate a film of air at the upstream region 12 of the ring sector 1. The invention makes it possible to provide a higher air flow rate at the upstream region 12 than at the downstream region 13 of the ring sector 1.

The heat exchange coefficient depends on the distance between the orifice 20 and the impacted region, and hence on the gap 7. As a general rule, reducing the gap 7 increases the heat exchange coefficient. Conversely, increasing the gap 7 decreases the heat exchange coefficient. It is thus possible to locally control the heat exchange between the cooling air and the wall 11 of the ring sector 1 by varying the gap 7. This parameter can additionally be combined with at least one of the other known parameters capable of varying the heat exchange coefficient, such as the diameter of the orifices, the number of orifices per row or the pitch between each row.

Since the hot gases progress from the upstream region 52 toward the downstream region 53, the upstream part 12 of the ring sector 1 is generally hotter than the downstream part 13 of the ring sector 1. It is thus recommended to cool the upstream part 12 more intensely. In this case, the multiperforated plate 2 can be designed in such a way that the gap 7 situated at the upstream region 12 of the ring sector 1 is smaller than the gap 7 situated at the downstream region 13 of the ring sector 1.

In a first embodiment of the invention represented in FIG. 1, the gap 7 is progressive linearly. The bottom 21 of the multiperforated plate 2 extends in a plane intersecting the axis (X) of revolution of the turbine 8, which is coincident with the axis (X) of revolution of the turbomachine 9. The bottom 21 of the multiperforated plate 2 forms an angle α with the axis (X) of revolution of the turbine 8. This angle α is necessarily greater than 0° and can amount to 45°. According to the operating conditions associated with each turbine, a correctly adjusted slope makes it possible to obtain a more uniform temperature of the ring sector 1.

Figure 3:
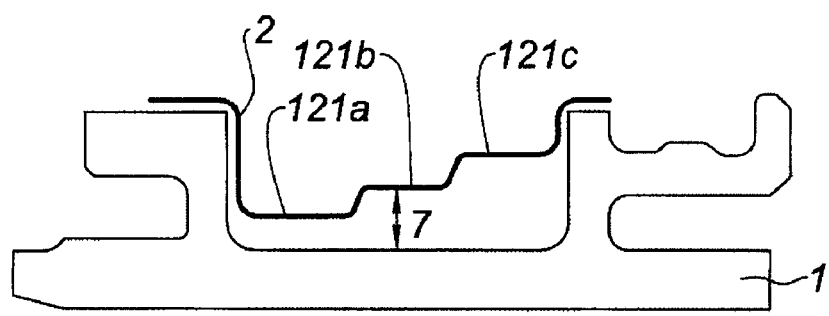
FIG. 3 represents a sectional view of a ring sector according to a second embodiment of the invention.

In a second embodiment of the invention represented in FIG. 3, the value of the gap 7 is progressive in stages, the bottom 21 of the multiperforated plate 2 having a "staircase" shape. The bottom 21 of the multiperforated plate 2 consists of a plurality of successive "stages" or "steps" 121a, 121b and 121c.

Figure 4:
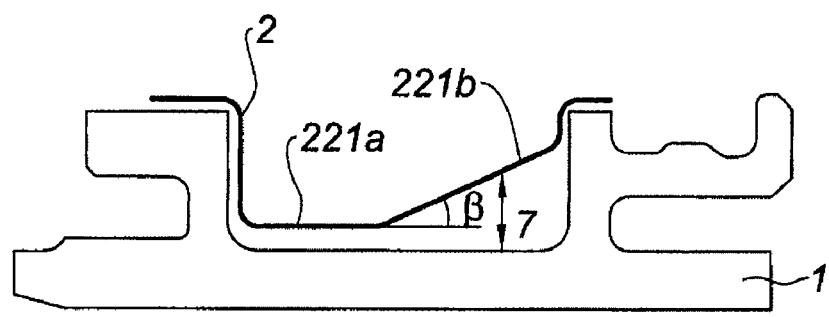
FIG. 4 represents a sectional view of a ring sector according to a third embodiment of the invention.

In a third embodiment of the invention represented in FIG. 4, the gap 7 is constant opposite a first part 221a of the multiperforated plate 2 and progressive opposite a second part 221b of the multiperforated plate 2, it being possible for this progression to be linear or curvilinear. In the example illustrated in FIG. 4, the second part 221b progresses linearly and forms an angle β with the first part 221a. This angle β is necessarily greater than 0° and can amount to 60°.

Figure 5:
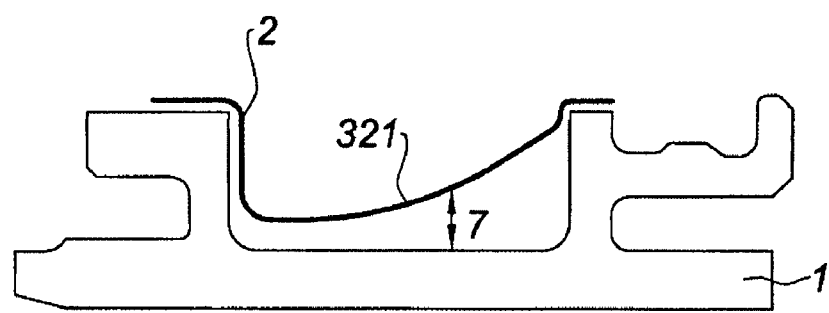
FIG. 5 represents a sectional view of a ring sector according to a fourth embodiment of the invention.

In a fourth embodiment of the invention represented in FIG. 5, the gap 7 is progressive in a curvilinear manner following a curve, for example a monotonic curve which increases from the upstream region toward the downstream region. The bottom 321 of the plate 2 is thus convex opposite the wall 11 of the ring sector 1.

Although the embodiments above describe gaps 7 which are progressive in an axial direction (X), it is possible to adapt the gap 7 so that it is progressive in a circumferential direction (Y), in a plane perpendicular to the axial direction, for example in order to correct the thermal effects induced by the inter-sector leaks.

The present invention also relates to a turbine ring comprising a plurality of ring sectors as described above, and to a turbine 8, represented in FIG. 6 by a dot pattern, comprising an aforementioned turbine ring.

Figure 6:
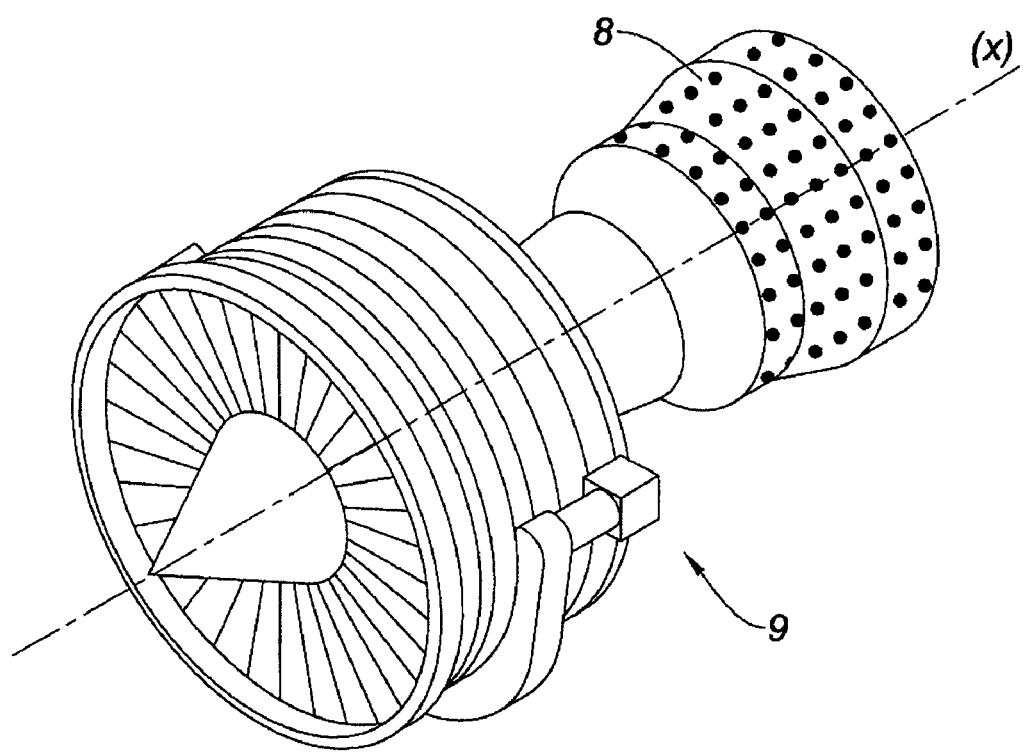
FIG. 6 represents a schematic perspective view of a turbomachine.

The invention also relates to a turbomachine 9, also represented in FIG. 6, comprising an aforementioned turbine 8.

The invention claimed is:

1. A turbine ring sector comprising:
a wall bounding an aerodynamic flowpath in which gases flow from an upstream region toward a downstream region, the wall including an inner surface which bounds the flowpath, an outer surface opposite the inner surface, and upstream and downstream tenons disposed at upstream and downstream ends of the ring sector, respectively, the inner and outer surfaces of the wall being substantially parallel to an axis of the turbine ring sector; and
a multiperforated plate, situated on the opposite side of the aerodynamic flowpath with respect to the wall, said multiperforated plate comprising first and second axial members, upstream and downstream transverse members which connect the first and second axial members at an upstream portion and a downstream portion of the first and second axial members, a first side wall that extends radially inward from the upstream transverse member, a second side wall that extends radially inward from the downstream transverse member, and a bottom wall that connects the first side wall and the second side wall, the bottom wall including a plurality of orifices,
wherein a first bath is defined by radial walls of the upstream and downstream tenons and the outer surface of the wall and a second bath is defined by the first and second side walls and the bottom wall of the plate, such that the second bath is housed in the first bath and a bottom surface of an upstream end of the plate abuts an upper surface of the upstream tenon and a bottom surface of a downstream end of the plate abuts an upper surface of the downstream tenon,
wherein the first side wall extends more radially inward than the second side wall such that a first end of the bottom wall at the first side wall is lower than a second end of the bottom wall at the second side wall,
wherein a distance between the outer surface of the wall of the ring sector and the bottom wall of the multiperforated plate defines a gap which is progressive in an axial direction, from the upstream region toward the downstream region, and
wherein a value of the gap situated at the upstream region is below a value of the gap situated at the downstream region.

2. The turbine ring sector as claimed in claim 1, wherein the gap is progressive linearly.

3. The turbine ring sector as claimed in claim 1, wherein the gap is progressive in a curvilinear manner.

4. The turbine ring sector as claimed in claim 1, wherein said gap is constant opposite a first part of the multiperforated plate and progressive opposite a second part of the multiperforated plate.

5. The turbine ring sector as claimed in claim 4, wherein the gap, opposite the second part of the multiperforated plate, is progressive linearly.

6. The turbine ring sector as claimed in claim 4, wherein the gap, opposite the second part of the multiperforated plate, is progressive in a curvilinear manner.

7. The turbine ring sector as claimed in claim 6, wherein the gap, opposite the second part of the multiperforated plate, is progressive in a curvilinear manner following a monotonic and increasing curve.

8. The turbine ring sector as claimed in claim 1, wherein the value of the gap is progressive in stages, the bottom of the multiperforated plate having a staircase shape.

9. A turbine ring comprising a plurality of ring sectors as claimed in claim 1.

10. A turbine comprising a turbine ring as claimed in claim 9.

11. A turbomachine comprising a turbine as claimed in claim 10.

12. The turbine ring sector as claimed in claim 1, wherein the upstream and downstream tenons each includes an outer wall connected to the radial wall and parallel to the axis of the turbine ring sector, and the upstream and downstream ends of the plate abut upper surfaces of the outer walls of the upstream and downstream tenons, respectively.

13. The turbine ring sector as claimed in claim 1, wherein a radial dimension of an upstream end of the bottom wall of the plate is lower than a radial dimension of a downstream end of the bottom wall of the plate.

14. The turbine ring sector as claimed in claim 1, wherein the bottom wall of the plate forms an angle with the axis, the angle being greater than 0°.

* * * * *